United States Patent [19]

Krejza et al.

[11] Patent Number: 4,899,782
[45] Date of Patent: Feb. 13, 1990

[54] STEAM PRESSURE COOKER

[75] Inventors: Jürgen Krejza, Kuchen; Eberhard Roth, Lonsee-Urspring; Sonja Bolek, Ulm, all of Fed. Rep. of Germany

[73] Assignee: WMF Wurttembergische Metallwarenfabrik AG, Fed. Rep. of Germany

[21] Appl. No.: 165,514

[22] Filed: Mar. 8, 1988

[30] Foreign Application Priority Data

Mar. 9, 1987 [EP] European Pat. Off. .......... 87103357.7

[51] Int. Cl.⁴ .............................................. A47J 27/08
[52] U.S. Cl. .................................... 137/523; 137/522; 220/203; 220/206
[58] Field of Search .................. 137/522, 523; 251/82; 220/203, 206, 209, 323

[56] References Cited

U.S. PATENT DOCUMENTS

| | | | |
|---|---|---|---|
| 2,483,297 | 9/1949 | Naylor | 220/203 |
| 2,614,723 | 10/1952 | Welden | 220/298 |
| 2,614,724 | 10/1952 | Wyman | 220/203 |
| 2,649,775 | 8/1953 | Welden | 220/203 X |
| 3,949,781 | 4/1976 | Scalabrin | 220/203 X |
| 3,973,694 | 8/1976 | Tess | 220/206 |
| 4,251,007 | 2/1981 | Behnisch | 220/203 X |
| 4,313,377 | 2/1982 | Jackson et al. | 220/206 X |
| 4,560,143 | 12/1985 | Robinson | 137/523 X |
| 4,735,190 | 4/1988 | Fischbach | 220/206 X |

FOREIGN PATENT DOCUMENTS

| | | |
|---|---|---|
| 0008465 | 8/1979 | European Pat. Off. . |
| 0123197 | 4/1984 | European Pat. Off. . |
| 2854840 | 7/1980 | Fed. Rep. of Germany . |
| 3223142 | 12/1983 | Fed. Rep. of Germany . |

*Primary Examiner*—John Rivell
*Attorney, Agent, or Firm*—Arnold, White & Durkee

[57] ABSTRACT

A steam pressure cooker (1) is described, which is provided with a lid (2) and a pressure relief valve (8), comprising a valve seat (7a), a valve body (9) adapted to have a load applied thereto in the direction of the valve seat (7a) by means of a spring (11) and an adjustable spring abutment (12), which is adapted to be displaced from an operative position in which the valve body (9) is pressed onto the valve seat (7a) to a steam-discharge position in which the valve body (9) is relieved of the load to such an extent that the steam can escape and which, for the purpose of cleaning, can be removed from the lid (2) to such an extent that the pressure relief valve (8) is freely accessible. In order to permit a better accessibility for the purpose of cleaning the pressure relief valve, without there being any necessity of disassembling the pressure relief valve and its support into their component parts, the spring abutment (12) is formed on a pivotable flap (14, 68) at which the valve body (9) is guided and supported and a control means (16, 40, 48, 56, 72, 75) is provided with the aid of which the flap (14, 68) can be pivoted from the operative position to the steam-discharge position as well as to the cleaning position and back.

45 Claims, 9 Drawing Sheets

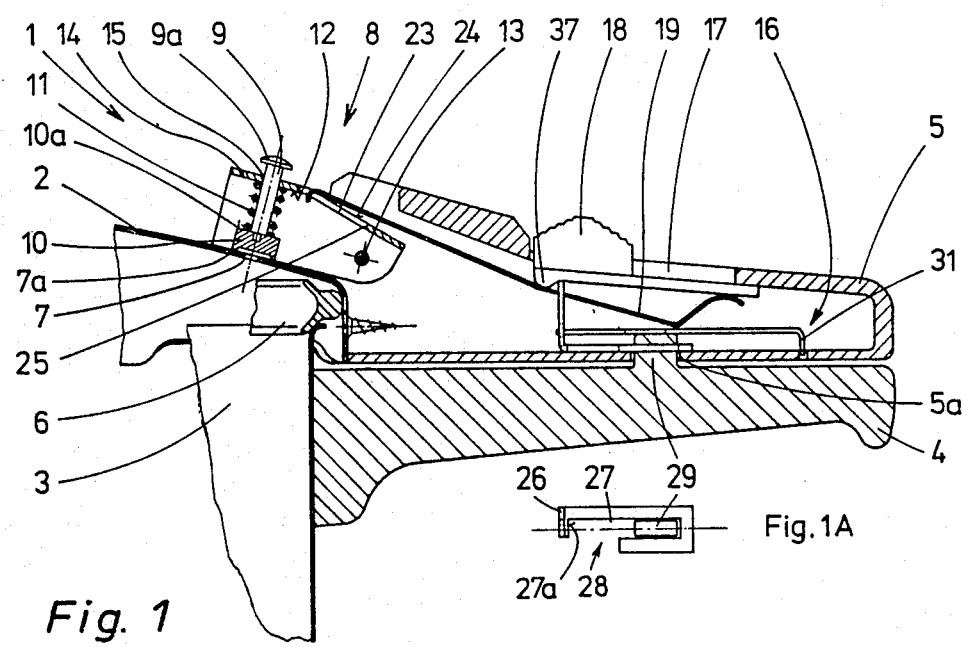
Fig. 1
Fig. 1A
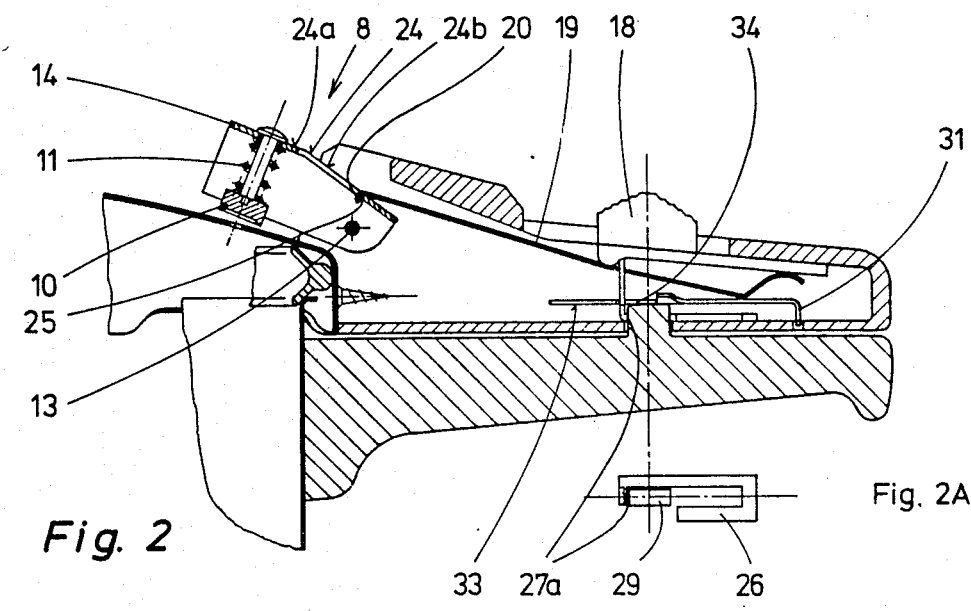
Fig. 2
Fig. 2A

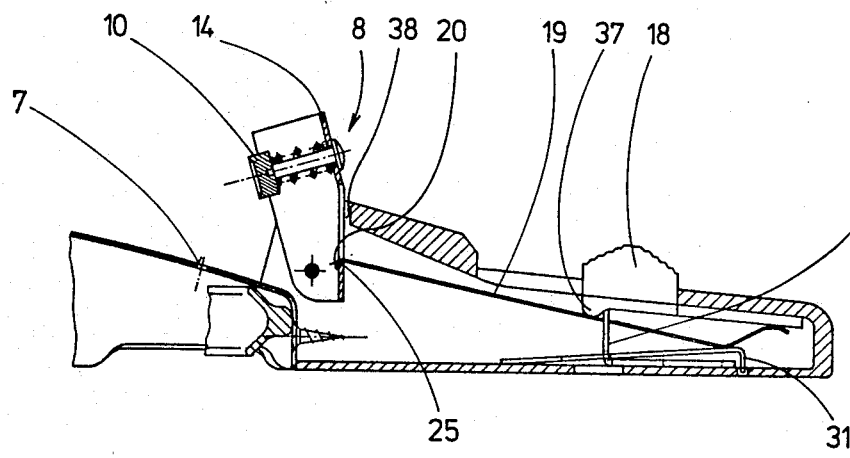
Fig. 3

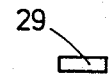

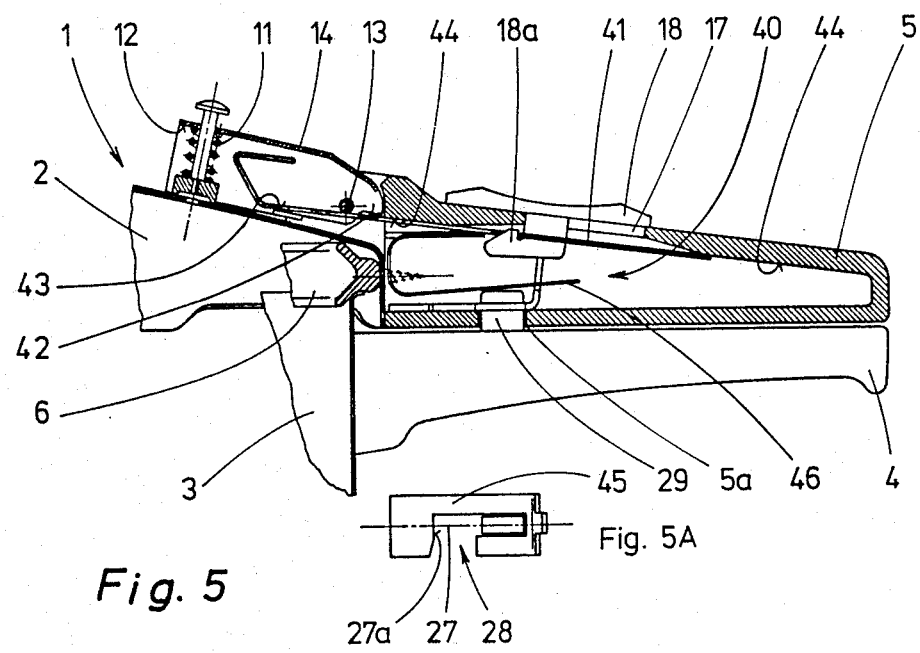

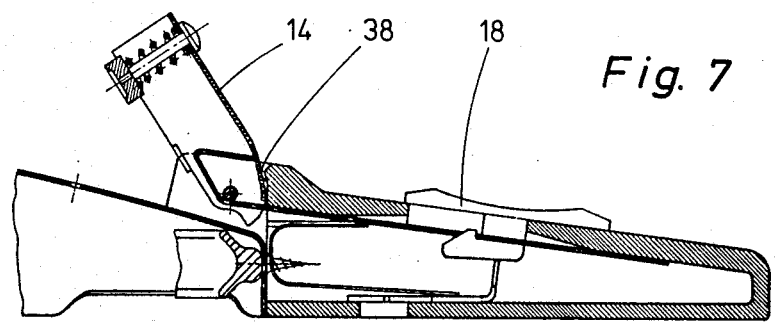
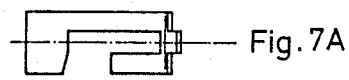
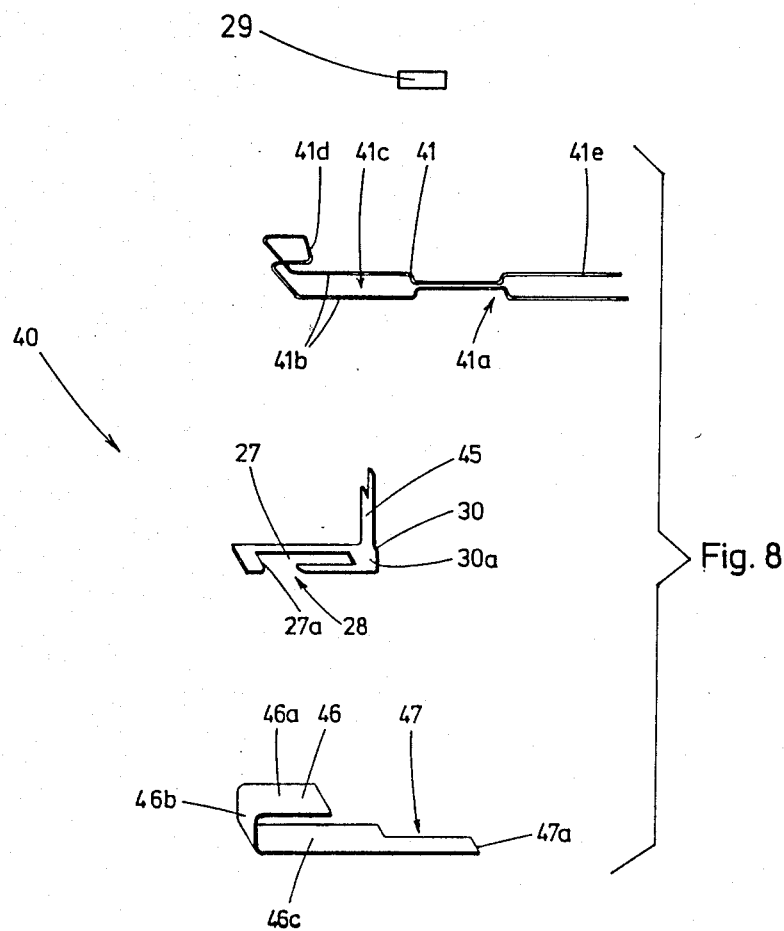

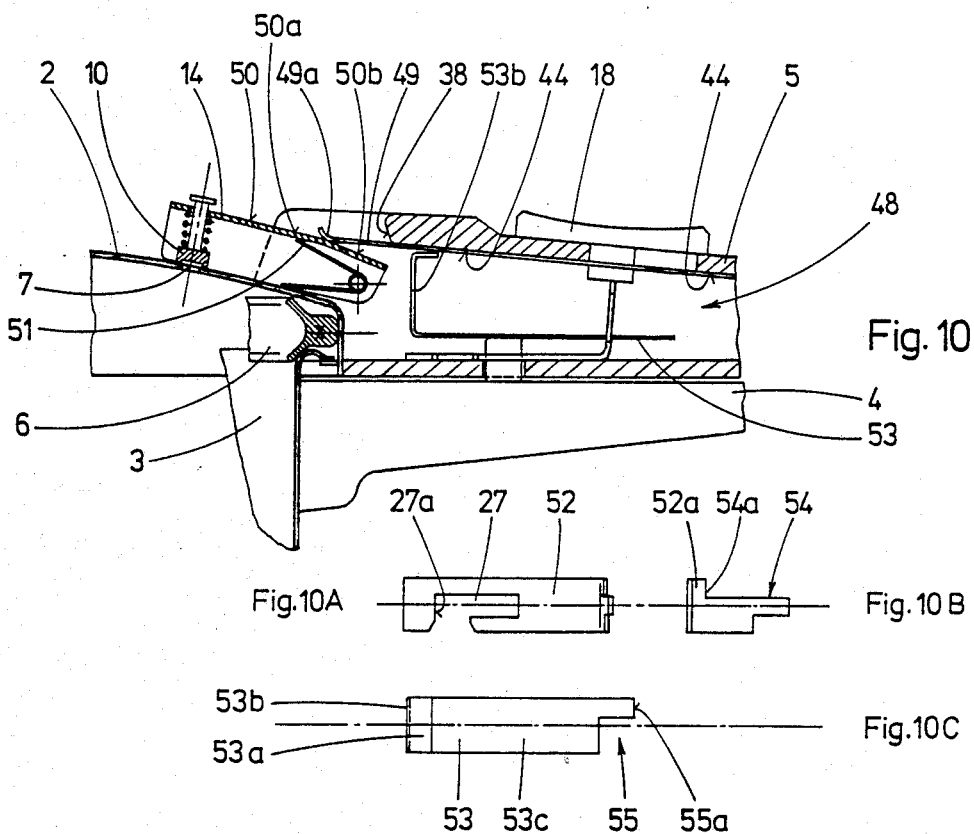

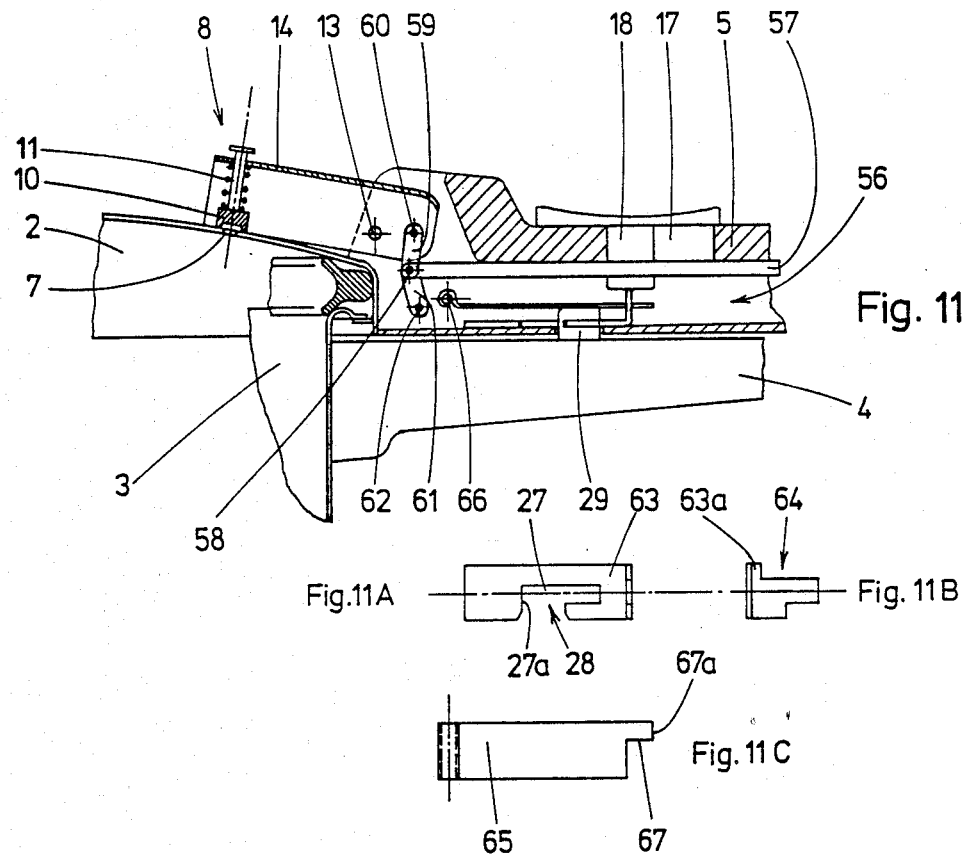

STEAM PRESSURE COOKER

BACKGROUND OF THE INVENTION

The invention refers to a steam pressure cooker, and in particular to pressure relief valves in such steam pressure cookers.

A known steam pressure cooker is illustrated in European patent No. 0 008 465. In the case of the known steam pressure cooker, the pressure relief valve is accommodated in a housing together with a tappet for indicating the pressure. The housing extends with an external thread member through an opening in the lid and is held on the inner side of said lid with the aid of a screw-fastened nut. A valve cap is screwed onto the valve housing on the outer side of the steam pressure cooker, and the distance between said valve cap and the lid can be increased or reduced by the user. In the interior of the valve cap there is provided a spring abutment for a spring, the other side of said spring resting on the valve body for the pressure relief valve and pressing said valve body against its valve seat. Hence, the response pressure for the pressure relief valve can be adjusted by screwing the valve cap upwards or downwards. Within a specific area, the pressure relief valve occupies its operative position in which the spring tension is greater than the desired steam pressure occurring in the interior of the cooking vessel during normal cooking processes. The valve cap can, however, be screwed upwards into a steam-discharge position in which the spring tension is increasingly reduced to values below the steam pressure in the interior of the cooking vessel. This permits a rapid discharge of steam so that the lid can be opened. For the purpose of cleaning, the nut must be screwed off and the entire valve housing must be removed from the lid. For making the valve seat then accessible and for cleaning it, it is additionally necessary to screw off the valve cap and to disassemble the pressure relief valve into its component parts, and this cannot be done without the risk of losing individual components. Moreover, the user always has to pay attention to the fact that all the individual parts have to be reinserted into the housing in the correct sequence and at the correct location and that the valve housing has to be fixedly connected to the lid with the aid of the nut. This, however, makes the cleaning process of the valve housing very complicated so that thorough cleaning will probably not be carried out a sufficient number of times. In this case, however, it may easily happen that, due to particles of food adhering to the valve or due to a layer of grease, the pressure relief valve will no longer function in a satisfactory manner.

U.S. Pat. No. 2,614,724 discloses a steam pressure cooker in the case of which the load acting on the pressure relief valve is not applied by means of a spring but by means of weight plates. The valve body is held and guided by the lower weight plate. The valve seat is located in the lid. The weight plates are secured to the lid such that they can be pivoted independently of one another so that they can be pivoted upwards individually for providing a possibility of varying the response pressure of the pressure relief valve in response to the desired pressure within the cooking vessel. Although cleaning can be effected in a comparatively easy manner in this case, the cooking vessel, when in operation, cannot be handled without danger of accident. For example, all weight plates have to be pivoted upwards for allowing a discharge of steam before the locking mechanism is disengaged so that the lid can be opened. When the weight plates, which are normally hot, are raised, a sharp, hot steam jet is discharged from the valve seat in the lid immediately adjacent the user's hand, and this steam jet will almost inevitably impinge on the user's hand.

The weight plates will inevitably increase the weight of the lid substantially so that it is perhaps no longer possible to hold said lid with only one hand. When the size of the valve opening is kept small so as to save weight, the risk of clogging will increase.

Hence, the present invention is based on the task of providing a steam pressure cooker of the above-mentioned type, which is provided with a lightweight, handy lid, which has a simple structural design and is easy to operate and easy to clean, and in the case of which the danger of accident is reduced to a very large extent.

This task is solved by claim 1 which provides a spring abutment upon a pivotable flap at which the valve body is guided and supported, and a control means which, with the aid of the flap, can be pivoted from the operative position to the steam discharge position, as well as to the cleaning position.

On the basis of the structural design according to the application, it is achieved that there is no longer any necessity of disassembling and re-assembling the pressure relief valve for the purpose of cleaning. Notwithstanding this, all parts of the pressure relief valve are freely accessible, and all adhering particles of food which may impair adequate functioning of the pressure relief valve can be removed by hand or under a jet of water. On the basis of the arrangement of the control means and the special steam-discharge position, it is additionally achieved that, on the one hand, the steam can escape comparatively slowly so that a sharp, hot jet will not be formed. On the other hand, the user's hand is positioned at the greatest possible distance from the location at which the hot steam escapes. Moreover, there is no longer any necessity of touching any hot part of the cooking vessel.

On the basis of the embodiment according to claim 2, the accessibility for cleaning purposes is still further improved by providing that, in the cleaning position, the valve body is pivoted away from the valve seat arranged on the lid.

Claim 3 describes a particularly advantageous structural design of the control means, in that the control means includes a control member which acts on the flap and which is adapted to be moved with the aid of an actuating means to be operated by the user.

Claim 4 describes a first example of an actuating means, which can be operated by hand in a particularly simple and easy manner in that the actuating means is a slide knob connected to the control member.

The arrangement of the pivot pin of the flap according to claim 5, in which the pivot pin of the flap is arranged on the side of the pressure relief valve facing the control means, permitting a compact construction.

The embodiments according to claims 6 to 8 are easy to manufacture and, notwithstanding this, they function in a reliable manner.

Claim 9 describes a first example of the arrangement of the guide surface.

The structural design according to claim 10 facilitates actuation.

Claims 11 and 12 describe a first example of pivoting the flap by means of the control member.

Claims 13 to 15 describe a second example indicating how the control member can move the flap.

Claims 16 and 17 describe a third example indicating how the control member can move the flap.

Claims 18 to 20 describe a fourth example, indicating how the control member can move the flap, in which the control member is connected to the flap via a joint arranged in a spaced relationship with the pivot pin.

Claims 21 to 23 describe a fifth example in the case of which the pivot pin of the flap is arranged at the pressure relief valve side facing away from the control means. It is thus possible to provide the control means with an extremely uncomplicated and very robust structural design.

Claims 24 and 25 refer to a sixth example in the case of which the flap is pivoted via a push button, which acts essentially perpendicularly on the control member.

The control means, which is accommodated in the interior of one handle half according to claim 26, is thus protected against damage to a very large extent.

In connection with a sliding block engaging a groove in accordance with claim 27, a rail adapted to be displaced with the aid of the actuating means is provided in a particularly advantageous manner, said rail guaranteeing (claims 27 to 30) that the flap cannot be moved to the cleaning position as long as the lid is still positioned on the cooking vessel. It is thus guaranteed in a simple manner that the pressure relief valve is not fully opened unintentionally.

An additional safety means preventing incorrect operation is described in claim 31. In this way, it is guaranteed that the pressure relief valve can only be moved to its operative position when the lid is located on the cooking vessel in a position predetermined for cooking. It follows that internal pressure cannot build up when the lid is not positioned correctly.

Claims 32 to 37 describe alternative structural designs of the locking member.

The structural designs according to claims 38 to 40 facilitate the closing of the lid, since, on the basis of said structural designs, the locking member blocking the groove can be raised more easily from its locking position.

In accordance with claim 41 different response pressures for the pressure relief function can be adjusted, for example by pretensioning the spring of the pressure relief valve for various response pressures.

BRIEF DESCRIPTION OF THE DRAWINGS

In the following, embodiments of the invention will be explained in detail on the basis of the drawings in which:

FIG. 1 shows a first embodiment of the invention in the operative position of the pressure relief valve, FIG. 1A shows the position of the rail of FIG. 1, FIG. 2 shows the embodiment of FIG. 1 in a steam-discharge position, FIG. 2A shows the position of the rail of FIG. 2, FIG. 3 shows the embodiment of FIG. 1 in a cleaning position, FIG. 5 shows an additional embodiment of the invention in the operative position, FIG. 5A shows the position of the rail of FIG. 5, FIG. 6 shows the embodiment according to FIG. 5 in a steam-discharge position, FIG. 6A shows the position of the rail in FIG. 6, FIG. 7 shows the embodiment according to FIG. 5 in a cleaning position, FIG. 7A shows the position of the rail of FIG. 7, FIG. 8 shows the control means of the embodiment according to FIG. 5 in an exploded view, FIG. 10 shows an additional embodiment of the invention in the operative position, FIG. 10A shows a top view of the rail according to FIG. 10, FIG. 10B shows a side view of the rail according to FIG. 10A, FIG. 10C shows a top view of the locking member according to FIG. 10, FIG. 11 shows an additional embodiment of the invention in the operative position, FIG. 11A shows a top view of the rail according to FIG. 11, FIG. 11B shows a side view of the rail according to FIG. 11A, FIG. 11C shows a top view of the locking member according to FIG. 11, FIG. 12A shows a top view of the rail of FIG. 12, FIG. 12B shows a side view of the rail of FIG. 12A, FIG. 12C shows a top view of the locking member of FIG. 12.

DESCRIPTION OF THE PREFERRED EMBODIMENTS

Figure 3A:
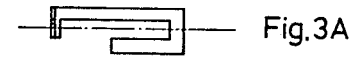
FIG. 3A shows the position of the rail of FIG. 3.

FIG. 1 shows in a schematic representation part of a steam pressure cooker 1 comprising a lid 2 and the actual cooking vessel 3. The cooking vessel 3 has secured thereto one handle half 4 of one of the conventional handles. The other handle half 5 is connected to the lid 2. The lid 2 is to be connected to the cooking vessel 3 e.g. via a bayonet joint in the manner known, and in the cooking position the handle halves 4 and 5 have to be in alignment with each other. The lid 2 and the vessel 3 are sealed against each other via a sealing ring 6 in a manner which is known as well.

The lid 2 is provided with an opening 7. A valve seat 7a is formed in spaced relationship with said opening 7 and is used for a pressure relief valve 8. The pressure relief valve 8 is additionally provided with a valve body 9 including a sealing member 10. A pressure spring 11 rests on a shoulder 10a of the sealing member 10. The other end of the pressure spring 11 abuts on a spring abutment 12, which is arranged on a flap 14 pivotable about a pivot pin 13. The flap 14 is provided with a guide opening 15, which extends substantially at right angles to the surface of the lid 2 and in which the valve body 9 is guided. The valve body 9 is secured against slipping out of the guide opening 15 by an enlarged head 9a. The spring abutment 12 on the flap 14 can be moved towards the lid 2 to such an extent that, in the operative position shown in FIG. 1, the spring 11 is pretensioned between the spring abutment 12 and the shoulder 10a with a spring tension guaranteeing the pressure relief function. The valve body 9 including the sealing member 10 is longer than the distance between the spring abutment 12 and the lid 2 in the operative position so that the valve body 9 projects above the guide opening 15 at the top of said opening. The pivot pin 13 is arranged on the side of the pressure relief valve (9) facing the handle and is preferably supported in the handle half 5. The handle half 5 is hollow in the interior thereof and contains a control means 16. The upper side of the handle half 5 has provided therein a slot 17 through which an actuating means constructed as a slide knob 18 and used for actuating the control means 16 extends, said actuating means being thus easily accessible to the operator.

Figure 4:
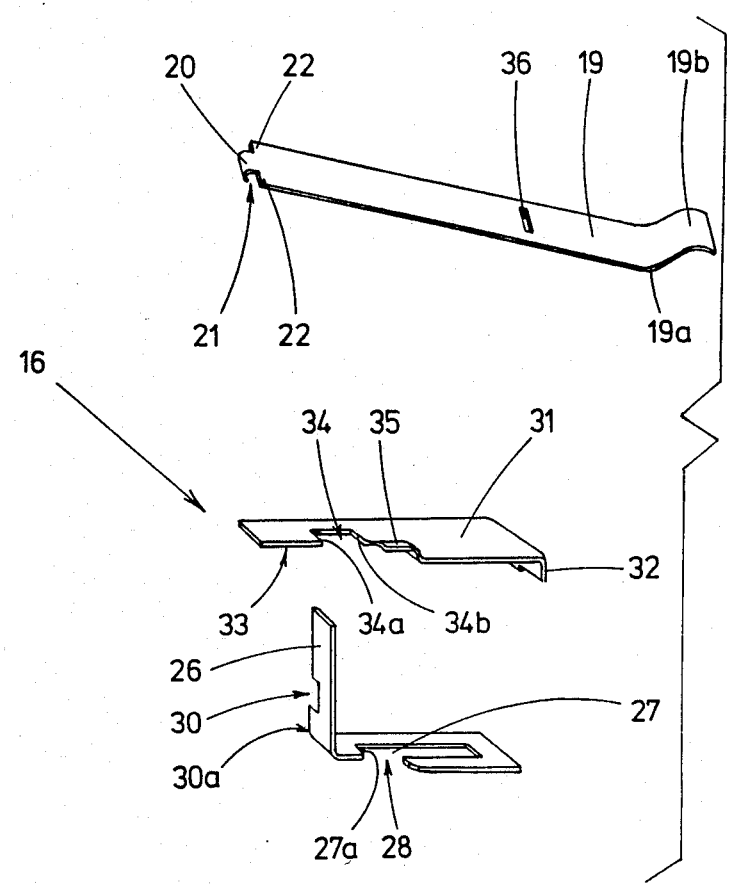
FIG. 4 shows the control means of the embodiment according to FIG. 1 in an exploded view.

The control means 16 is provided with a control member 19, which can also be seen from FIG. 4. The control member 19 has a strip-shaped structural design, is made of a sheet of spring steel and has, at one end thereof, a bent nose 20 enclosing a recess 21 on its bottom side. The nose 20 is narrower than the control member 19 so that two contact areas 22 extend on both sides of said nose 20. The control member 19 engages via its nose 20 a slot 23, which is provided in the upper side of the flap 14 facing away from the lid 2. Guide surfaces 24 extend on both sides of the slot 23, the contact areas 22 of the control member 19 coming into contact with said guide surfaces 24. The guide surfaces 24 extend essentially in the direction of actuation of the slide knob 18, but they are inclined upwards relative to this path of movement. The guide surfaces 24 comprise a first area 24a, which is more distant from the slide knob 18, and a second are 24b, which follows said first area in the direction of the slide knob 18, the contact areas 22 of the control member 19 being located in the first area 14a in the operative position shown in FIG. 1. The end of the slot 23 located next to the pivot pin 13 is formed as a stop web 24 capable of entering the recess 21 of the nose 20. The end of the slot 23 located next to the pivot pin 13 is formed as a stop web 25 capable of entering the recess 21 of the nose 20. The end of the control member 19 facing away from the nose 20 is bent at 19a and 19b. The slide knob 18 is connected to a vertical leg of an L-shaped rail 26 such that it is adapted to be entrained thereby, said rail 26 being made of a sheet metal strip. The horizontal leg includes a L-shaped groove 27 with an end edge 27a, which leads up to an inlet opening 28 arranged in the vicinity of the vertical leg. The inlet opening 28 and the L-shaped groove 27 are dimensioned such that a sliding block 29 can be received therein. The sliding block 29 is secured to the handle half 4 arranged on the vessel 3, and it projects in the direction of the handle half 5 and is capable of entering an inlet gap 5a in the upper handle half 5 when the handle halves 4 and 5 are brought into alignment with each other. When the slide knob 18 occupies the position shown in FIG. 1, i.e. the position at the end of the slot 17 facing the lid, the sliding block 29 will be positioned in the interior of the L-shaped groove 27, as can be seen from FIG. 1A, and, consequently, it will be locked against a movement along the inlet gap 5a by means of the rail 26 so that the handle halves 4 and 5 can no longer be moved relative to each other, as would be necessary for opening the lid 2. Hence, the steam pressure cooker 1 cannot be opened in this position of the slide knob 18.

As is shown in detail by FIG. 4, the vertical leg of the rail 26, which is connected to the slide knob 18, is provided with a recess 30 through which a locking member 31 extends. Also the locking member 31 essentially consists of a thin sheet metal strip and is provided with an angled portion 32. The angled portion 32 is tiltably supported in the wall of the handle half 5 which faces the handle half 4, and it projects into the interior of the cavity of the handle half 5. The locking member 31 includes, at its end facing away from the angled portion 32, an area 33 with which said locking member 31 projects through the recess 30 of the rail 26 in the position shown in FIG. 1. In the direction of the angled portion 32, said area 33 is followed by a recess 34 having a front edge 34a located on the side of the lid as well as a rear edge 34b. The depth of the recess 34 is at least equal to that of the recess 30, preferably it is slightly greater than that of the recess 30. A bent portion 35 follows said recess 34 in the direction of the angled portion 32, said bent portion 35 forming an extension of the rear edge 34b and said locking member 31 being adapted to be supported by the sliding block 29 in the vicinity of the rear edge 34b and behind the bent portion 35. The bent portion 35 has on its bottom side an oblique ramp surface, the purpose for which said ramp surface is used being explained in detail hereinbelow.

As will especially be evident from FIGS. 1 and 4, the control member 19 is provided with a slot 36 through which the rail 26 extends. The control member 19 is thus entrained when the slide knob 18 is being moved in the slot 17. The slide knob 18 is—at the side facing the control member 19—provided with a projecting cam 37. With its lower edge 19a of the bent portion, the control member 19 rests on the locking member 31 between the ramp surface 35 and the angled portion 32. With the other edge 19b of the bent portion, the control member 19 abuts on the slide knob 18. In the operative position shown in FIG. 1, the cam 37 projects beyond the straight connection between the point where the lower edge 19a of the bent portion rests on the locking member 31 and the location where the contact areas 22 abut on the guide surfaces 24. This has the effect that the resilient control member 19 is pretensioned so that via the control member 19 and the contact areas 22 a force can be applied to the guide surfaces 24 of the flap 14, said force pretensioning via the spring abutment 12 the spring 11 of the pressure relief valve 8 with the spring tension for the pressure relief function. The spring tension is adapted to be pretensioned in the manner known for different response pressures. Since, as can be seen from FIG. 1A, both handle halves 4 and 5 are at the same time locked relative to each other, the cooking process can be started.

When, after expiration of the predetermined exact cooking period, the pressure in the steam pressure cooker 1 is to be reduced rapidly, the slide knob 18 is drawn back within the slot 17 towards the free end of the handle halves 4 and 5. In the course of this process, the nose 20 will move within the slot 23 in the direction of the stop web 25, and this will have the effect that the contact areas 22 slide downwards over the first area 24a onto the second area 24b of the guide surfaces 24. This, however, will cause a slight reduction of the pressure acting via the control member 19 on the flap 14 and by means of the spring abutment 12 on the spring 11 so that as higher internal pressure in the interior of the steam pressure cooker 1 can lift the sealing member 10 from the valve seat 7a. When the slide knob 18 is drawn back further within the slot 17, the spring 11 will relax completely, and this will also have the effect that the flap 14 is raised to such an extent that, in the non-tensioned condition of the spring 11, the sealing member 10 is held in spaced relationship with the valve seat 7a. For reasons of simplifying the definition, this position shown in FIG. 2 and FIG. 2A is referred to as steam-discharge position, although a discharge of steam can, of course, already have taken place before, depending on the internal pressure in the interior of the steam pressure cooker 1.

As can be seen from FIG. 2 and FIG. 2A, the slide knob 18 can be drawn back within the slot 17 to such an extent that the end face 27a of the L-shaped groove 27, which is located next to the vertical leg of the rail 26, comes into contact with the sliding block 29. In this position, the recess 34 of the locking member 31 is located on one level with the recess 30 in the rail 26 so that the locking member 31 is no longer caught by the rail 26 when the support provided by the sliding block 29 no longer exists. The nose 20 has moved along the entire length of the slot 23 and encloses by means of its recess 21 the stop web 25 of the slot 23. Hence, the nose 20 is located in closest proximity to the pivot pin 13 and slightly on the side facing away from the pressure relief valve 8. When the whole overpressure has been reduced to zero, the pot can be opened. For this purpose, the handle halves 4 an 5 are moved relative to each other so that the bayonet joint between the lid 2 and the cooking vessel 3 is disengaged, whereupon the lid can be raised.

As soon as the handle halves 4 and 5 have been rotated relative to each other to such a extent that the sliding block 29 has been moved out of the inlet opening 28, the locking member 31 will drop into the locking position shown in FIG. 3 and the end face 27a of the L-shaped groove 27 will be moved out of contact with the sliding block 29. The slide knob 18 can thus be fully moved back within the slot 17 into a cleaning position shown in FIGS. 3 and 3A. In the course of this movement, the flap 14 is pivoted fully upwards by the nose 20 acting on the stop web 25, and it will be expedient to provide a stop means 38 for the flap 14 on the handle half 5. In this position, the control member 19 is essentially relaxed, or rather it is pretensioned only to such an extent that the stop web 25 is reliably held in its position within the recess 21 of the nose 20. It follows that the pressure relief valve 8 and its sealing member 10 as well as the opening 7 are accessible easily and rapidly for the purpose of cleaning.

The locking member 31, which is located above the inlet opening 28 on one level with the inlet gap 5a, and the vertical leg of the rail 26, which is located on one level with the sliding block 29, prevent the sliding block 29 from entering the L-shaped groove 27 in the cleaning position. If the user wants to re-attach the lid 2 to the cooking vessel 3, the slide knob 18 will have to be returned to the position shown in FIG. 2. For this purpose, the rail 26 is moved in the direction of the lid 2 unit in the area 30a, its vertical leg comes into contact with the front edge 34a of the recess 34 facing the support area 33. The slide knob 18 is thus prevented from continuing its movement so that the pressure relief valve 8 cannot yet be brought into its operative position. This excludes the possibility of overpressure build-up within the steam pressure cooker 1 as long as the lid 2 has not yet been closed correctly. The inlet opening 28 is, however, again located on one level with the sliding block 29, the entry of the sliding block 29 being only prevented by the locking member 31, which is still located in the locking position. When the handle halves 4 and 5 are moved further towards each other, the sliding block 29, supported by a bevelled surface 39 shown in FIG. 9, will move under the ramp surface of the bent portion 35. This will have the effect that the locking member 31 is raised to such an extent that the front edge 34a and the area 33 are again located on one level with the recess 30 in the rail 26. The actuation means 18 can then be displaced into the foremost position shown in FIG. 1, and in the course of this process the edge 34a moves through the recess 30 and the sliding block 29 enters fully into the L-shaped groove 27 until the pressure relief valve 8 has been pivoted to its operative position.

FIGS. 5 to 8 disclose an additional embodiment; identical reference numerals refer to identical or comparable structural components and will not be explained again. A cavity of the handle half 5 has again arranged therein a control means 40 actuated via a slide knob 18. The control means 40 includes a control member 41, which, as can be seen from FIG. 8, consists of a bent spring steel wire. The control member 41 has a fastening section 41a fitted into a hook structure 18a which is connected to said slide knob 18. The hook structure extends through an opening of the control member 41 and engages under or rather extends round the fastening section 41a so that when the slide knob 18 is being displaced within the slot 17, the control member 41 can be carried along essentially without any amount of play. The control member 41 is additionally provided with a guide area 41b enclosing an opening 41c. A contact section 41d extends above the guide area 41b. On the other side of the fastening section 41a, a second guide area 41e is provided.

The flap 14 is hollow, and it has provided therein an opening 42, in the vicinity of the pivot pin 13, in its end facing the handle half 5. At the end of the opening 42 facing away from the handle half 5, a guide surface 43 is provided, which extends below the pivot pin 13 and which ends in horizontal spaced relationship with said pivot pin. The guide surface 43 is preferably arranged on a web extending under the flap 14 at both sides thereof.

The internal surface of the hollow handle half 5 is constructed as an abutment 44 in front of and beyond the slot 17, said abutment projecting into the cavity of the handle half 5 farther than the support surface for the control member 41 on the hook structure 18a so that the guide areas 41b and 41e are drawn against the abutments 44 for the purpose of pretensioning the control member 41. The guide area 41b projects through the opening 42 into the interior of the flap 14, and, in the operative position shown in FIG. 5, it rests on the guide surface 43. Due to the pretensioned condition of the control member 41 between the hook structure 18a, the abutments 44, and a point of support on the pivot pin 13, the guide area 41b applies a force to the guide surface 43, said force holding the flap 14 in the position in which it abuts on the lid 2, the spring 1; being pretensioned via the spring abutment 12 with a tension required for the pressure relief function.

In a manner which has already been described hereinbefore, a rail 45 is connected the slide knob 18 such that it is adapted to be entrained thereby, said rail 45 being again provided with the recess 30 and with an L-shaped groove 27 having an inlet opening 28 for the sliding block 29 projecting from the handle half 4, and said inlet opening being adapted to be aligned with the inlet gap 5a in the upper handle half 5 in a manner which has already been described. The difference between the rail 45 and the rail 26 is to be seen in the fact that the rail 45 is arranged such that it is rotated by 180~, the end face 27a and the inlet opening 28 being located on the side of the L-shaped groove 27 facing away from the vertical leg.

In the case of this embodiment, too, a locking member 46 is provided, said locking member being made of a substantially U-shaped strip consisting of a sheet of spring steel. One of the legs 46a abuts on the control member 41 in the vicinity of the fastening section 41a. The connection web 46b of the U-shaped locking member 46 is secured in position on the lid 2, preferably with the aid of fastening means securing also the handle half 5 to the lid 2. The other leg 46c extends up to and beyond the inlet gap 5a, and, in the position shown in FIG. 5, it is supported by the sliding block 29, whereby it is pretensioned in the direction of the other leg 46a. This support is achieved due to the fact that the leg 46c has provided therein a recess 47 corresponding to the recess 30.

When the pressure relief valve 8 is to be displaced to its steam-discharge position shown in FIG. 6, the slide knob 18 is drawn back to such an extent that the end edge 27a of the rail 45 comes into contact with the sliding block 29. This has the effect that the control member 41 is carried along to such an extent that the guide area 41b is disengaged form the guide surface 43, i.e. that the pretension acting on the guide surface 43 is eliminated. The contact section 41d of the control member 41 comes into contact with the internal surface of the hollow flap 14 above the pivot pin 13 and pivots said flap 14 upwards to an extent permitting the discharge of steam. The leg 46c of the locking member 46 has been moved fully out of the recess 30 of the rail 45. The lid 2 can be rotated for releasing the bayonet joint and, subsequently, it can be removed. As soon as the sliding block has moved out of the inlet opening 28, the arm 46c of the locking member 46 snaps downwards and blocks the inlet opening 28 and the inlet gap 5a.

When the sliding block 29 has been disengaged from its engagement with the rail 45, the slide knob 18 can be drawn back into the cleaning position shown in FIG. 7. In this position, the control member 41 is drawn back to such an extent that the contact section 41d is capable of pivoting the flap 14 to its highest position, preferably again against the stop means 38. In the course of this process, the end face 27a of the L-shaped groove 27 moves over the inlet gap 5a. This means that the sliding block cannot enter the inlet gap 5a as long as the slide knob 18 occupies the cleaning position.

When the lid 2 is to be re-attached to the cooking vessel 3, it will first be necessary to displace the slide knob 18 to the steam-discharge position shown in FIG. 6 so that the inlet opening 28 is in alignment with the inlet gap 5a. In the course of this process, a rear edge 47a of the locking member 46 will, however, come into contact with an area 30a of the vertical leg of the rail 45 below the recess 30 so that the slide knob 18 cannot be displaced further into the operative position.

Figure 9:
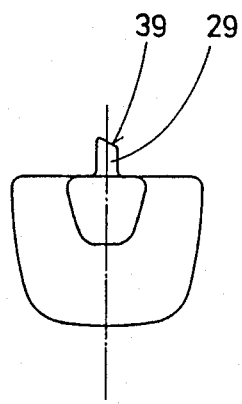
FIG. 9 shows a cross-section through the sliding block.

When the handle halves 4 and 5 are further aligned relative to each other, the sliding block will—again supported by the bevelled surface 39 shown in FIG. 9—move under the leg 46c of the locking member 46 and it will raise said leg to such an extent that the rear edge 47a will again be positioned on one level with the recess 30. The slide knob 18 can now be displaced fully into the operative position shown in FIG. 5, and in the course of this process the guide area 41b will again move onto the guide surface 43 and apply to said guide surface a load in the direction of the lid in such a way that the spring 11 is pretensioned in the desired manner.

FIG. 10 as well as 10A to 10C show an additional embodiment; identical reference numerals refer to identical or comparable structural components. The hollow interior of the upper handle half 5 has arranged therein a control means 48 which is adapted to be actuated via a slide knob 18. The control means 48 is provided with a control member 49, which consists of a strip made of a sheet of spring steel. In a manner known, the control member 49 is connected to the slide knob 18 such that it is adapted to be entrained thereby, and, due to the way in which it is fastened to the slide knob 18, it is drawn against abutments 44 under pretension, said abutments extending in front of and behind the slot 17. At the end facing the flap 14, the control member 49 is provided with an upwardly bent portion 49a, which rests on a guide surface 50 formed above the pivot pin 13 on the upper side of the flap 14. The guide surface 50 comprises a first area 50a and a second area 50b following said first area 50a in the direction of the handle half 5. The first area 50a is inclined relative to the direction of movement of the slide knob 18 by a first, smaller angle, whereas the second area 50b extends at a larger angle of inclination relative to the direction of movement of said slide knob 18. The flap 14 has applied thereto a load by means of a torsion spring 51, said load being applied in the direction of the control member 49. The torsion spring 51 preferably extends round the pivot pin 13.

In the operative position shown in FIG. 10, the control member 49 is—due to the fact that it is fastened to the slide knob 18 and due to the fact that it abuts on the abutments 44—pretensioned in such a way that the upwardly bent portion 49a presses onto the guide surface 50 of the flap 14, said upwardly bent portion 49a being located on the first area 50a of the guide surface. The angle of inclination of this area 50a of the guide surface 50 is preferably adapted to the self-locking angle of inclination between the control member 49 and the flap 14, and the lever conditions between the pivot pin and the application point of the torsion spring on the flap on the one hand and the application point of the upwardly bent portion 49a on the other are dimensioned such that the torsion spring 51 is not capable of displacing the control member 49 automatically from its operative position.

In a manner which has already been described, the control means 48 is provided with a rail 52 and with a locking member 53. The rail 52 is arranged in a way analogous with the way employed in the case of the embodiment according to FIG. 5, and it is provided with the L-shaped groove whose inlet opening 28 and whose end edge 27a are arranged at the side of the groove 27 facing away from the vertical leg. The side of the rail 52 facing away from the inlet opening 28 is provided with a recess 54, which is arranged in the vertical leg thereof and the functions of which are comparable to those of the recess 30. As can be seen from FIG. 10B, the recess 54 extends up to and into the area of the slide knob 18.

The locking member 53 shown in FIG. 10C is again made of a U-shaped strip of sheet metal consisting of spring steel and including a shorter leg 53a, a connection web 53b and a longer leg 53c. The shorter leg 53a is secured on the side of the abutment 44, the longer leg 53c resting on the sliding block 29 in the operative position shown in FIG. 10. In a manner which has already been described, the leg 53c is provided with a recess 55 cooperating with the recess 54 in such a way that it allows said leg 53c to rest on the sliding block 29. Said leg 53c can, in addition, also on a step 54a defining the lower limit of the recess 54.

When the slide knob 18 is drawn back from the operative position shown in FIG. 10 into a steam-discharge position, which is not shown, the upwardly bent portion 49a of the control member 49 will be moved from the area 50a of the guide surface 50 onto the area 50b which is inclined downwards at a steeper angle. In this way, the pretension of the control member 49 is reduced and the application point of the control member 49 is displaced towards the pivot pin 13. This permits the torsion spring 51 to pivot the flap 14 upwards to such an extent that the spring tension of the spring 11 is eliminated and that, in a manner which has already been described, the sealing member 10 is pivoted into spaced relationship with the opening 7 in the lid 2, said spaced relationship being such that the cooking pressure can safely be reduced to zero in the steam-discharge position. In the course of this process, the end face 27a of the L-shaped groove 27 comes into contact with the sliding block 29, in a manner which has already been described, and the locking member 53 moves out of the recess 54 in the rail 52. The lid 2 can be rotated and opened, the longer leg 53c of the locking member 53 falling downwards in the course of this process.

For the purpose of cleaning, the slide knob 18 is fully drawn back in the manner which has already been described, whereby the upwardly bent portion 49a is drawn to a position in which it is located at its minimum distance from the pivot pin 13. The torsion spring 51 is thus capable of relaxing fully and of pivoting the flap 14 in an expedient manner again into contact with the stop means 38. At the same time, the end edge 27a moves over the inlet gap 5a. Closing of the cooking vessel is effected in a manner which has already been described, and, before the operative position is reached, a rear edge 55a of the locking member 53 comes into contact with an area 52a below the step 54a of the rail 52 and prevents further displacement of the slide snob 18 until the locking member 53 with its edge 55a has been raised above the level of the step 54a by means of the sliding block 29.

FIG. 11 shows a further embodiment of the invention; identical reference numerals refer to identical or comparable structural components. The hollow interior of the upper handle half 5 has provided therein a control means 56 with a control member 57, which is again connected to the slide knob 18 such that it is adapted to be entrained thereby. The control member 57 is constructed as a rigid push bar, which has, on the end facing the flap 14, articulated thereon a pivotable lever 59 via a joint 58. The pivotable lever 59 is connected to the flap 14 via a second joint 60. The pivot axes of the joints 58 and 60 extend parallel to the pivot pin 13. The second joint 60 is arranged on the side of the pivot pin (13) facing the handle half 5 and it is arranged in horizontally spaced relationship with said pivot pin 13. The first joint 58 lies below the second joint 60, but it is located at a small horizontal distance in the direction of the pivot pin 13 so that, when the control member 57 is moved away from and into the operative position, the pivotable lever 59 is moved beyond its dead center. On the side of the control member 57 facing away from the pivotable lever 59, a support lever 61 is pivotably supported on the joint 58, said support lever 61 being supported via a joint 62 in the same manner as the pivotable lever 59.

When the slide knob 18 is drawn back from the operative position shown in FIG. 11, the pivotable lever and the support lever are first moved beyond their dead centers, and this will have the effect that the spring abutment 12 will be moved a certain distance towards the lid. However, as soon as the dead center of the pivotable lever 59 is exceeded, the flap 14 will be relieved of the load so that said flap 14 will be pressed upwards under the influence of the relaxing spring 11, and this will have the effect that the sealing member 10 will uncover the opening 7. At the same time, the joints 58 and 60 will endeavour to come into alignment with the pivot pin 13 in a straight line so that this, too, will cause the flap 14 to be pivoted slightly upwards into the steam-discharge position.

In a manner which has already been described, the vertical leg of a rail 63 is connected to the slide knob 18 such that it is adapted to be entrained thereby. The rail 63 has a structural design which is similar to that of the rail 52 of FIG. 10, the L-shaped groove 27 being arranged such that its end edge 27a and its inlet opening 28 face away from said vertical leg. Said vertical leg has again provided therein a recess 64 whose structural design and arrangement are analogous to that of the recess 54 in rail 52.

The control means 56 additionally includes a locking member 65, which has a strip-shaped structural design and which is supported such that it can be pivoted about a pin 66 arranged in the upper handle half 5. The pivot axis of the pin 66 extends parallel to the pivot pin 13 and is arranged within the cavity of the upper handle half 5 in such a way that, in the operative position shown in FIG. 11, the locking member 65 rests essentially horizontally on the surface of the sliding block 29, a recess 67 provided in the locking member 65 engaging the recess 64 in the rail 63. When the rail 63 is displaced into the steam-discharge position, the recess 67 provided in said locking member will be disengaged from the recess 64 in said rail 63 in the manner which has already been described so that the locking member 65 can drop into its locking position as soon as the sliding block 29 has been moved out of the L-shaped groove 27.

Subsequently, the slide knob 18 can be drawn back completely, which will have the effect that the pivotable lever 59 draws the flap 14 into the cleaning position. In the case of this embodiment, it is, however, also possible to provide only two positions for the slide knob 18. In this case, the load applied to the flap 14 would have to be fully eliminated in the second, i.e. the steam-discharge position of the slide knob 18, so that said flap can pivot about its pivot pin 13 and can be raised by hand into its cleaning position.

Closing of the steam pressure cooker 1 is effected, in the manner which has already been described, by removing first the end edge 27a from the inlet gap 5a. In the course of this motion, the rear edge 67a of the locking member 65 comes into contact with an area 63a below the recess 64 in the rail 63 so that further displacement of the slide knob 18 is not possible until the sliding block 29, supported by its bevelled surface 39, raised the locking member 65 in such a way that the rail 63 can again be displaced to the position which is shown in FIG. 11 and in which the recesses 67 and 64 are in engagement with each other.

Figure 12:
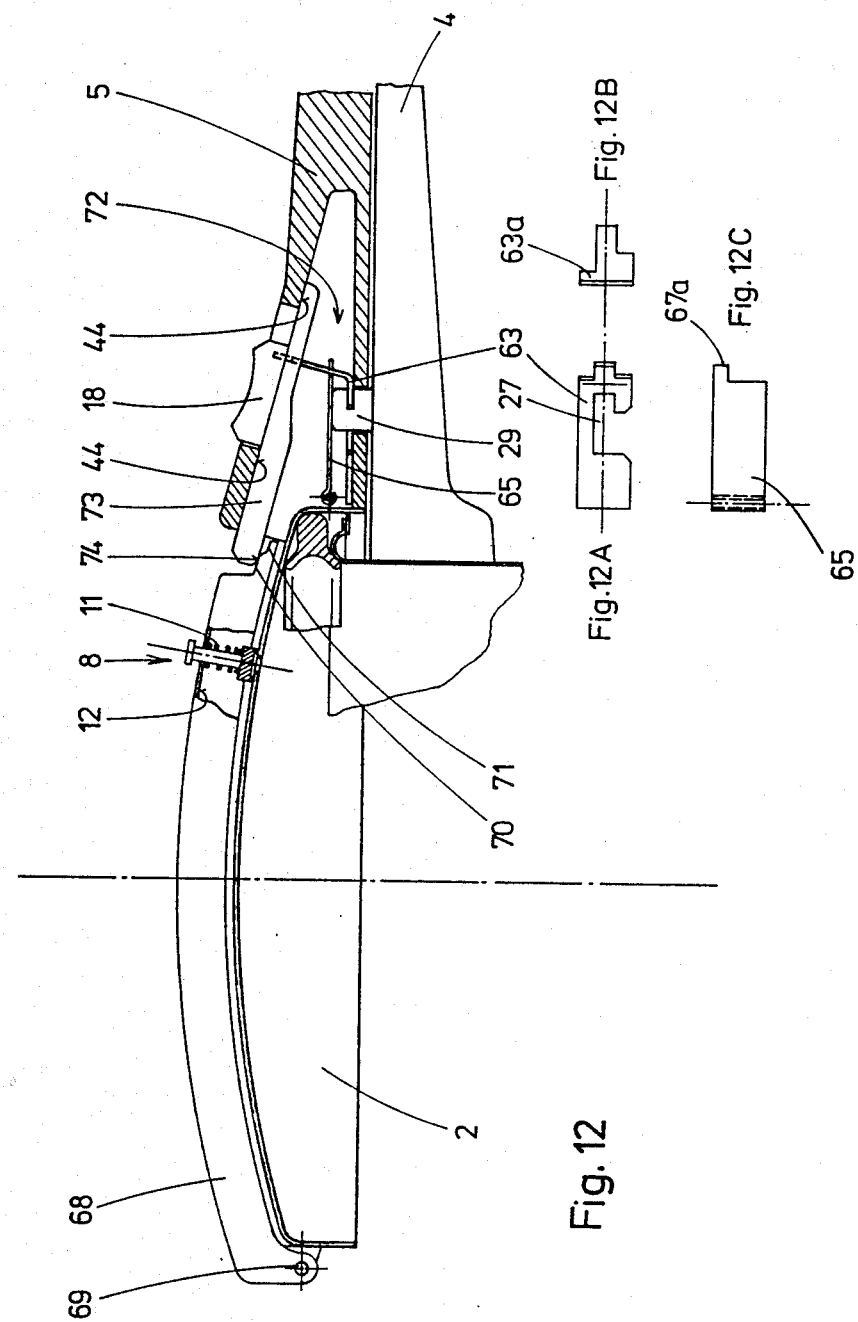
FIG. 12 shows an additional embodiment of the invention in the operative position.

In FIG. 12 an additional embodiment can be seen, identical or comparable structural components being provided with identical reference numerals. In the case of this embodiment, the pressure relief valve 8 is provided on a flap 68, which is adapted to be pivoted about a pivot pin 69, said pivot pin 69 being located on the side of the lid 2 positioned opposite the upper handle half 5.

The flap 68 extends over the entire diameter of the lid and is provided with first and second clamping steps 70 and 71 on its side facing the upper handle half 5. The second clamping step 71 is positioned adjacent the handle half 5 and is located at a smaller distance from the lid 2 than the first clamping step, which directly follows said second clamping step 71 in the direction of the pivot pin 69. The pressure relief valve 8 can be arranged at any point of the flap 68. In the interior of the upper handle half 5, a control means 72 is arranged, which includes a rigid control member 73 and which is adapted to be actuated via a slide knob 18 in a manner which has already been described. In the embodiment shown, it will be expedient when the control member 73 is integrally connected to the slide knob 18. At the end facing the flap 68, the control member 73 is provided with a clamping surface 74, which is adapted to be successively brought into engagement with the clamping steps 70 and 71 by displacing the slide knob 18. In this case, the control member 73 is held in contact with abutments 44 provided on the inner side of the cavity of the upper handle half 5.

When the control member 73 occupies the position which is shown in FIG. 12 and in which said control member is fully raised, the clamping surface 74 rests on the first clamping step 70 and maintains, via the flap 68, the spring abutment 12 in a position in which the spring 11 is pretensioned with the tension guaranteeing the pressure relief function. When the slide knob 18 is drawn back, the clamping surface 74 will slide from the first clamping step 70 onto the second clamping step 71. This will have the effect that, due to the force of the relaxing spring 11, the spring abutment 12 will move away from the lid 2 so that the steam pressure in the interior of the steam pressure cooker can be reduced via the opening 7.

Also the control means 72 includes a rail and a locking member having a structural design and producing an effect analogous with that of the rail 63 and of the locking member 65 of FIG. 11. When the clamping surface 74 is in engagement with the second clamping step 71, the end edge 27a of the L-shaped groove 27 of the rail 63 abuts on the sliding block 29. When the two handle halves 4 and 5 are rotated relative to each other for the purpose of opening the lid 2, the sliding block 29 will move out of the L-shaped groove 27 in a manner which has already been described so that the control member 73 can be drawn back completely. When the control member 73 has been drawn back completely, the clamping surface 74 is disengaged from the clamping steps 70 and 71 and, consequently, from the flap 68 so that the flap 68 can be pivoted upwards completely for the purpose of cleaning. The lid 2 is attached and the steam pressure cooker is closed in the way which has already been described, in which connection it is self-evident that the flap 68 must be closed before the control member 73 is moved back.

Figures 13, 13A:
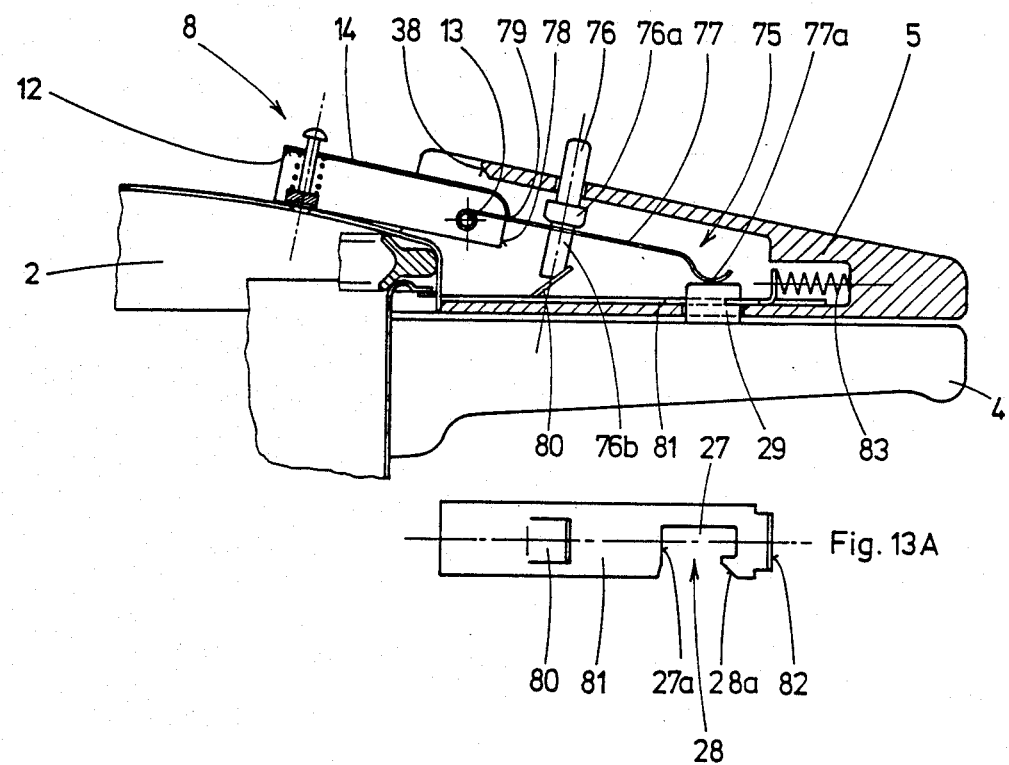
FIG. 13 shows an additional embodiment of the invention in the operative position.
FIG. 13A shows a top view of the rail according to FIG. 13.

In FIG. 13 an additional embodiment can be seen; identical reference numerals are used for identical or comparable structural components. Just as in the case of FIGS. 1 to 11, this embodiment, too, uses a flap 14 whose pivot pin 13 is arranged on the side of the pressure relief valve 8 facing the handle half 5, said pivot pin 13 being secured in position in the handle half 5. A cavity of the upper handle half 5 has again provided therein a control means 75, which is adapted to be actuated by an actuation means constructed as a push button 76. The control means 75 includes a strip-shaped control member 77, which is made of a sheet of spring steel and which projects with one end thereof through an opening 78 into the interior of the flap 14 where it is rotatably supported, preferably such that it is rotatable about the pivot pin 13. The upper edge of the opening 78 is constructed as a stop means 79, which is adapted to be brought into contact with the upper side of the control member 77. The end of the control member 77 facing away from the flap 14 is provided with a bent portion 77a resting on the sliding block 29 as long as said sliding block is located in the inlet gap 5a. The bent portion 77a and the stop means 79 are adapted to each other as well as to the position of the pivot pin 13 in such a way that the spring abutment 12 is located at a distance from the lid 2 guaranteeing the pressure relief function, when, as shown in FIG. 13, the step means 79 rests on the control member supported by the sliding block 29 and when the push button 76 has not been actuated.

The push button 76 is provided with a flange 76a, which is arranged above the control member 77, and with a pin 76b extending through said control member 77. In the operative position, the flange 76a is located a short distance above the control member 77 or its is arranged such that it slightly touches said control member 77. The pin 76b projects downwards on the other side of the control member 77 and abuts on the upper portion of an oblique surface 80 connected to a rail 81. The rail 81 is provided with an L-shaped groove 27 whose leg facing away from the end edge 27a is shortened and whose inlet opening 28 is provided with a bevelled portion 28a. On the other side of the groove 27, a spring abutment 82 for a pressure spring 83 is arranged on a bent-up portion of the rail 81, the other end of said pressure spring being supported by the wall of the upper handle half 5. The spring 83 endeavors to move the rail 81 into the locking position in which the sliding block 29 is held in the L-shaped groove 27.

When the push button 76 is pressed for the purpose of discharging steam, its flange 76a will come into contact with the resilient control member 77 and will press said control member into a sagging position. This, however, will have the effect that the control member 77 moves away from the stop means 79 so that the spring 11 can press the spring abutment 12 into a position where it is located at a greater distance from the lid 2, and this will have the effect that the overpressure in the steam pressure cooker 1 can be reduced through the opening 7.

At the same time, the pin 76b is, however, moved downwards as well and presses via the oblique surface 80 the rail 81 against the force of the spring 83 into a position in which the end edge 27a comes into contact with the sliding block 29. In this position, the two handle halves 4 and 5 can be rotated relative to each other for 29 has been moved out of the L-shaped groove, the bent portion 77a will be brought out of engagement with the sliding block 29, and the control member 77 will drop down. This, however, will have the effect that the control member 77 will fully be disengaged from the stop means 79 so that the flap 14 can manually be pivoted upwards into the cleaning position. It will be expedient when, in this case, too, a stop means 38 is provided. At the same time, the spring 83 will relax again and move the bevelled portion 28a over the inlet gap 5a and the oblique surface 80 below the pin 76b, whereby the push button 76 will be returned to its starting position. The control member 77 remains, however, in its relaxed condition so that pivoting and an application of load to the pressure relief valve towards the operative position are excluded.

For the purpose of returning the lid 2 to the cooking position, it will be sufficient to reinsert the sliding block 29 into the inlet gap 5a. Via the bevelled portion 28a of the inlet opening 28, the rail 81 will be displaced against the action of the spring 83 in such a way that the sliding block 29 can enter the inlet opening 28.

The bevelled surface 39 of the sliding block 29 raises the bent portion 77a of the control member 77 again to the position which is shown in FIG. 13 and in which the flap 14 is again preloaded towards the operative position via the stop means 79.

As modifications of the embodiments which have been described and shown hereinbefore, the details described and shown on the basis of the individual figures can be exchange for one another. For example, the ramp surfaces 35 can be provided on all the locking members shown. Another possibility is that the ramp surfaces 35 are provided together with or as an alternative to the bevelled surface 39 of the sliding block. The guide surfaces for the control member can be arranged at any location of the flap 14 as long as said flap 14 can still be pivoted. The guide surface in the embodiment according to FIGS. 5 to 8 can be provided in the form of a continuous surface and can also comprise two areas which are inclined at different angles. The valve seat provided in the lid may consist not only of a simple opening, but of one of the elaborate valve seats which are well-known from the prior art, said valve seat cooperating then positively with a sealing member on the valve body. The dimensions of the flap, in particular the distance between the spring abutment and the lid in the operative position, are provided in accordance with the force of the spring of the pressure relief valve and in accordance with the desired steam pressure during the cooking process. Furthermore, it is not absolutely necessary that the valve body is pivoted together with the flap. It would, for example, also be possible to guide the valve body without any head loosely in the guide opening and to connect it to the lid. This will have the effect that, when the flap is pivoted to the steam-discharge position, the spring will be relieved of the load so that the overpressure can be discharged. In the cleaning position, the flap is fully raised from the valve body so that the pressure relief valve s accessible and can be cleaned. Although the accommodation in the hollow interior of a handle half is a particularly simple and space-saving possibility, the control means may also be provided at any other location of the lid.

What is claimed is:

1. A steam pressure cooker (1), which is provided with a lid (2) and a pressure relief valve (8), comprising a valve seat (7a), a valve body (9) adapted to have a load applied thereto in the direction of the valve seat (7a) by means of a spring (11) and an adjustable spring abutment (12), which is adapted to be displaced from an operative position in which the valve body (9) is pressed onto the valve seat (7a) to a steam-discharge position in which the valve body (9) is relieved of the load to such an extent that the steam can escape and which, for the purpose of cleaning, can be removed from the lid (2) to such an extent that the pressure relief valve (8) is freely accessible, characterized in that the spring abutment (12) is formed on a pivotable flap (14, 68) at which the valve body (9) is guided and supported, and that a control means (16, 40, 48, 56, 72, 75) is provided with the aid of which the flap (14, 68) can be pivoted from the operative position to the steam discharged position as well as to the cleaning position and back.

2. A steam pressure cooker according to claim 1, characterized in that, in the cleaning position, the valve body (9) is pivoted away from the valve seat (7a) arranged on the lid (2).

3. A steam pressure cooker according to claim 1 or 2, characterized in that the control means (16, 40, 48, 56, 72, 75) includes a control member (19, 41, 49, 57, 73, 77) which acts on the flap (14, 68) and which is adapted to be moved with the aid of an actuating means (18, 76) to be operated by the user.

4. A steam pressure cooker according to claim 3, characterized in that the actuating means is a slide knob (18) connected to said control member (19, 41, 49, 57, 73).

5. A steam pressure cooker according to claim 1, characterized in that a pivot pin (13) of the flap (14) is facing the control means (16, 40, 48, 56, 75).

6. A steam pressure cooker according to claim 1, characterized in that the flap (14) is provided with a guide surface (24, 43, 50) on which a control member (19, 41, 49) is guided such that it can be displaced transversely to a pivot pin (13) of the flap (14).

7. A steam pressure cooker according to claim 6, characterized in that the control member (19, 41, 49) has applied a load thereto in its abutting position on the guide surface (24, 43, 50).

8. A steam pressure cooker according to claim 7, characterized in that the control member (19, 41, 49) has a resilient structural design and is pretensioned in the direction of the guide surface (24, 43, 50).

9. A steam pressure cooker according to one of claims 6 to 8, characterized in that the guide surface (24, 50) is located above the pivot pin (13) on the upper side of the flap (14) facing away from the lid (2).

10. A steam pressure cooker according to claim 6, characterized in that the guide surface (24, 43, 50) extends upwards at an oblique angle relative to the direction of movement of a slide knob (18).

11. A steam pressure cooker according to claim 6, characterized in that a slot (23) is provided, which extends substantially parallel to the guide surface (24) and which is engaged by a nose (20) provided on said control member (19).

12. A steam pressure cooker according to claim 11, characterized in that one end of the slot (23) is provided with a stop web (25) and that the nose (20) is provided with a recess (21) adapted to said stop web (25) and extending round said stop web (25) in an entraining position at least when the transition to the cleaning position takes place.

13. A steam pressure cooker according to one of claims 6 to 8, characterized in that the guide surface (43) is located below the pivot pin (13) in the operative position.

14. A steam pressure cooker according to claim 13, characterized in that the control member (41) is provided with a contact section (41d), which, at least when the transition to the cleaning position takes place, can be brought into an entraining position of engagement with a section of the flap (14) positioned above the pivot pin (13).

15. A steam pressure cooker according to claim 13, characterized in that, when the transition from the operative position to the steam-discharge position takes place, the control member (41) is disengaged from the guide surface (43).

16. A steam pressure cooker according to one of claims 6 to 8, characterized in that, by means of a second spring (51), the flap (14) has applied thereto a load in the direction of the control member (49) resting on the guide surface (50).

17. A steam pressure cooker according to one of claims 11 or 12 characterized in that the guide surface (24) comprises a first area (24a) extending at a smaller angle relative to the direction of movement of a slide knob actuating means (18) and a second area (24b) extending at a larger angle relative to said direction of movement, the control member (19) abutting on said first area (24a) when it is in the operative position.

18. A steam pressure cooker according to claim 1, characterized in that the control means (56) comprises a control member (57), the control member (57) is connected to the flap (14) via a joint (60) arranged in spaced relationship with a pivot pin (13) of the flap (14).

19. A steam pressure cooker according to claim 18, characterized in that the joint (60) is arranged on the side of the pivot pin (13) facing away from the pressure relief valve (8).

20. A steam pressure cooker according to one of claims 18 or 19, characterized in that the control member (57) is pivotably connected to a pivotable lever (59) adapted to be rotated about the joint (60), said pivotable lever (59) being moved beyond a dead center when the transition from the operative position to the steam-discharge position takes place.

21. A steam pressure cooker according to claim 1, characterized in that a pivot pin (69) of the flap (68) is arranged on the side of the pressure relief valve (8) facing away from the control means (72).

22. A steam pressure cooker according to claim 21, characterized in that there are provided at least one first and one second clamping step (70, 71) and a clamping surface (74) which is adapted to be successively brought into engagement with said clamping steps (70, 71) the pressure relief valve (8) having applied thereto a load so that it occupies its operative position when the clamping surface (74) is in engagement with said first clamping step (70), whereas in the case of an engagement between the clamping surface (74) and the second clamping step (71) the pressure relief valve (8) occupies its steam-discharge position.

23. A steam pressure cooker according to claim 22, characterized in that the clamping steps (70,71) are arranged on the flap (68), that the control means (72) comprises a control member (73), and that the clamping surface (74) is arranged on the control member (73).

24. A steam pressure cooker according to claim 1, characterized in that the control means (75) comprises a control member (77) which acts on the flap (14) and which is adapted to be moved with the aid of an actuating means (76) to be operated by the user, and that the actuating means is a push button (76) which acts essentially perpendicularly on the control member (77).

25. A steam pressure cooker according to claim 24, characterized in that the control member (77) has a resilient structural design and is supported such that it is pivotable about a pivot pin (13), said control member (77) resting, with its end facing away from said pivot pin (13), on an abutment (29) and cooperating with a stop means (79) provided on said flap (14).

26. A steam pressure cooker according to claim 1 characterized in that the control means (16, 40, 48, 56, 72, 75) is accommodated within a cavity in a first handle half (5) secured to the lid (2), and an actuating means (18, 76) extends through the wall of the handle to the exterior of said handle.

27. A steam pressure cooker according to claim 1, characterized in that from a second handle half (4), which is arranged on a cooking vessel (3), a sliding block (29) projects towards a first handle half (5) and engages a groove (27) for the purpose of locking the two handle halves (4, 5) in the operative position.

28. A steam pressure cooker according to claim 27, characterized in that the groove (27) has a substantially L-shaped structural design and is arranged in a rail (26, 45, 52, 63, 81) which is adapted to be displaced into and out of a locking position by an actuating means (18, 76).

29. A steam pressure cooker according to claim 28, characterized in that, prior to the transition into the cleaning position, the movement of the actuating means (18, 76) is stopped with the aid of a stop means (27a).

30. A steam pressure cooker according to claim 29, characterized in that said stop means is formed by an end face (27a) of the L-shaped groove (27) abutting on the sliding block (29).

31. A steam pressure cooker according to claim 27, characterized in that there is provided a locking member (31, 46, 53, 65, 77) which allows the valve body (9) to be pressed onto the valve seat (7a) and into the operative position only if the lid (2) is located on the cooking vessel (3) in a position predetermined for cooking.

32. A steam pressure cooker according to claim 31, characterized in that the locking member (31, 46, 53, 65, 77) rests on the sliding block (29) in the operative position of the pressure relief valve (8).

33. A steam pressure cooker according to claim 31, characterized in that, during the movement of an actuating means (18, 76) from an operative position, the locking member (31, 46, 53, 65, 77) is disengaged from its position of support on the sliding block (29) and is adapted to be moved downwards into a locking position.

34. A steam pressure cooker according to any one of claims 31 to 32, characterized in that the locking member (53, 65) is pivotably supported and drops into a locking position due to its own weight.

35. A steam pressure cooker according to any one of claims 31 to 33, characterized in that the locking member (31, 46, 77) is spring-loaded.

36. A steam pressure cooker according to claim 35, characterized in that the control means (16) comprises a resilient control member (19), and that the locking member (31) has applied a load thereto by the resilient control member (19).

37. A steam pressure cooker according to any one of claims 31 to 33, characterized in that the locking member (46, 77) has the structural design of a third spring.

38. A steam pressure cooker according to claim 31, characterized in that there is provided a ramp surface (35, 39) for raising the locking member (31, 46, 53, 65, 77) so that the sliding block (29) can enter.

39. A steam pressure cooker according to claim 38, characterized in that the ramp surface (39) is provided on the sliding block.

40. A steam pressure cooker according to claim 38, characterized in that the ramp surface is provided on the locking member (31, 46, 53, 65, 77).

41. A steam pressure cooker according to claim 1 characterized in that the spring (11) of the pressure relief valve (8) can be pretensioned for various response pressures.

42. A steam pressure cooker according to claim 6, 18, 21, 24 or 26 characterized in that, in the cleaning position, the valve body (9) is pivoted away from the valve seat (7a) arranged on the lid.

43. A steam pressure cooker according to claim 6, 18, 21 or 26 characterized in that the control means (16, 40, 48, 56, 72) comprises a control member (19, 41, 49, 57, 73) which acts on the flap (14, 68) and which is adapted to be moved with the aid of an actuating means (18) to be operated by the user, and that the actuating means is a slide knob (18) connected to said control member (19, 41, 49, 57, 73).

44. A steam pressure cooker according to claim 6, 18, 24 or 26 characterized in that a pivot pin (13) of the flap (4) is arranged on the side of the pressure relief valve (8) facing the control means (16, 40, 48, 56, 75).

45. A steam pressure cooker according to claim 16, characterized in that the guide surface (50) comprises a first area (50a) extending at a smaller angle relative to the direction of movement of a slide knob actuating means (18) and a second area (50b) extending at a larger angle relative to said direction of movement, the control member (49) abutting on said first area (50a) when it is in the operative position.

* * * * *